(12) United States Patent
Chao et al.

(10) Patent No.: US 6,393,485 B1
(45) Date of Patent: May 21, 2002

(54) METHOD AND APPARATUS FOR MANAGING CLUSTERED COMPUTER SYSTEMS

(75) Inventors: Ching-Yun Chao; Patrick M. Goal; Richard James McCarty, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/181,825

(22) Filed: Oct. 27, 1998

(51) Int. Cl.[7] .............................................. G06F 13/00
(52) U.S. Cl. ...................................................... 709/231
(58) Field of Search ................................ 709/200, 202, 709/203, 105, 208, 209, 210, 217, 218, 219, 231; 714/4, 2, 22, 3, 6

(56) References Cited

U.S. PATENT DOCUMENTS

| | | | |
|---|---|---|---|
| 5,136,498 A | 8/1992 | McLaughlin et al. | 364/184 |
| 5,426,774 A | 6/1995 | Banerjee et al. | 395/575 |
| 5,600,791 A | 2/1997 | Carlson et al. | 395/184 |
| 5,666,486 A | 9/1997 | Alfieri et al. | 395/200 |
| 5,727,206 A | 3/1998 | Fish et al. | 395/618 |
| 5,732,206 A | 3/1998 | Mendel | 395/182 |
| 5,748,883 A | 5/1998 | Carlson et al. | 395/184 |
| 6,195,680 B1 * | 2/2001 | Goldszmidt et al. | 709/203 |

OTHER PUBLICATIONS

International Business Machines; Dynamic Key–Boundary Multi–Cluster Virtual Sequential Access Method Data Sets; Jan. 1998; p. 563; IBM Technical Disclosure Bulletin; vol. 41, No. 01.

Kittur, S.; Fault Tolerance In A Distributed Chorus/MiX System; 1996; pp. 219–228; Proceedings of the USENIX 1996 Annual Technical Conference.

Cohen, LS; Technical Description of the DECsafe Available Server Environment; 1995; pp. 89–100; Journal Paper.

Muench, E.; Database Failover In A VAX Cluster System; Jun. 1991; pp. 112–117; MUG Quarterly, vol. 21, No. 3.

Corsini, P.; MuTEAM: An Experience In The Design Of Robust Multimicroprocessor Systems; Oct. 1985; pp. 23–35; Computer Systems Science and Engineering.

Corsini, P.; The Architecture and the Fault–Treatment of MuTEAM; 1984; pp. 1–13; Fault–Tolerant Computing Systems; 2nd GI/NTG/GMR Conference.

Corsini, P.; MuTEAM: A Multimicroprocessor Architecture with Decentralized Fault Treatment; 1984; pp. 206–223; Proceedings of the Seventeenth Hawaii International Conference on System Sciences, vol. 1.

* cited by examiner

*Primary Examiner*—Robert B. Harrell
(74) *Attorney, Agent, or Firm*—Duke W. Yee; Jeffrey S. LaBaw; Stephen R. Tkacs

(57) ABSTRACT

A clustered computer system provides both speed and reliability advantages. However, when communications between the clustered computers is compromised those same computers can become confused and corrupt database files. The present method and apparatus are used to improve the management of clustered computer systems. Specifically, the system expands the number of nodes available for failover conditions.

27 Claims, 9 Drawing Sheets

STANDBY'S

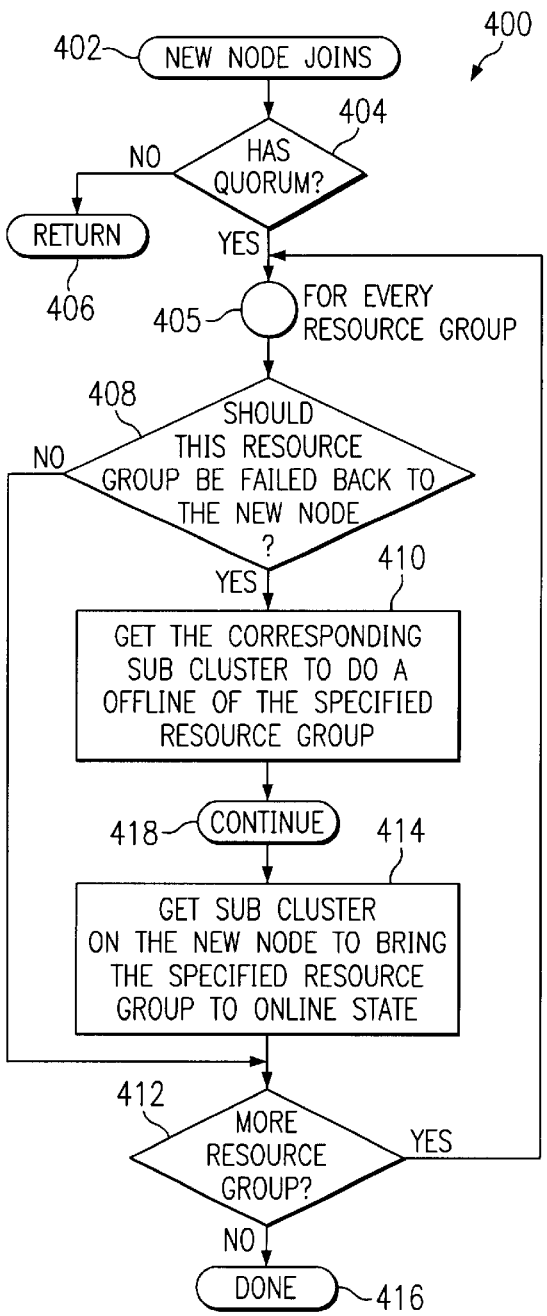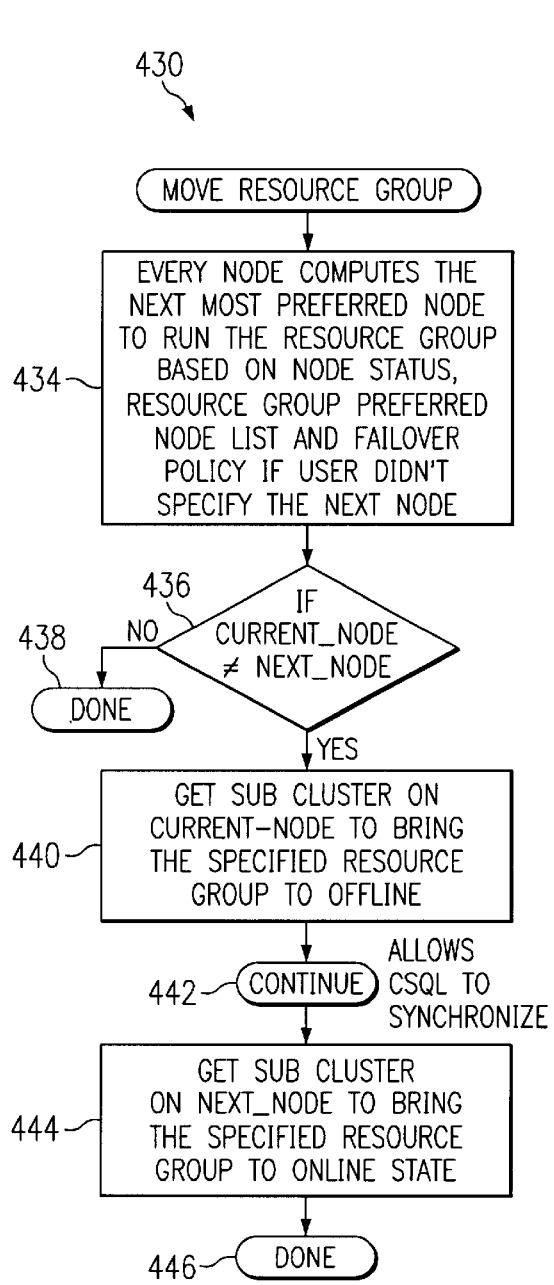
FIG. 4
FIG. 4a

| Ch routine | Action |
|---|---|
| BRING_COMPUTER_UP | Evaluate markup_action from computers where computer = $_get_event_node() ; evaluate action from ch_routines where $_has_quorum() and ch_routine = NODE_UP; |
| NODE_UP | Evaluate failback_action from ch_resource_groups where current_node<>$_get_event_node() ; evaluate release_action from ch_resource_groups where current_node <>next_node; evaluate acquire_action from ch_resource_groups where current_node = "" and next_node = $_get_event_node() : |

RESOURCE GROUP TABLE (CLASS)    CLASS METHODS

| ch_resource_group | A_sample_resource_group |
|---|---|
| failover_policy | cascading |
| failback_policy | autohoming |
| failback_action | update ch_resource_groups set next_node = $_failback_node() where ch_resource_group = this ch_resource_group; |
| release_action | execute $_resource_group_offline() ; |
| acquire_action | execute $_resource_group_online() ; |
| current_node | |
| next_node | |

*FIG. 6*

METHOD AND APPARATUS FOR MANAGING CLUSTERED COMPUTER SYSTEMS

BACKGROUND OF THE INVENTION

1. Technical Field

The present invention relates generally to a distributed data processing system and in particular to a method and apparatus for managing a server system within a distributed data processing system. Still more particularly, the present invention relates to a method and apparatus for managing a clustered computer system.

2. Description of Related Art

A clustered computer system is a type of parallel or distributed system that consists of a collection of interconnected whole computers and is used as a single, unified computing resource. The term "whole computer" in the above definition is meant to indicate the normal combination of elements making up a stand-alone, usable computer: one or more processors, an acceptable amount of memory, input/output facilities, and an operating system. Another distinction between clusters and traditional distributed systems concerns the relationship between the parts. Modern distributed systems use an underlying communication layer that is peer-to-peer, There is no intrinsic hierarchy or other structure, just a flat list of communicating entities. At a higher level of abstraction, however, they are popularly organized into a client-server paradigm. This results in a valuable reduction in system complexity. Clusters typically have a peer-to-peer relationship.

There are three technical trends to explain the popularity of clustering. First, microprocessors are increasingly fast. The faster microprocessors become, the less important massively parallel systems become. It is no longer necessary to use super-computers or aggregations of thousands of microprocessors to achieve suitably fast results. A second trend that has increased the popularity of clustered computer systems is the increase in high-speed communications between computers. The introduction of such standardized communication facilities as Fibre Channel Standard (FCS), Asynchronous Transmission Mode (ATM), the Scalable Coherent Interconnect (SCI), and the switched Gigabit Ethernet are raising inter-computer bandwidth from 10 Mbits/second through hundreds of Mbytes/second and even Gigabytes per second. Finally, standard tools have been developed for distributed computing. The requirements of distributed computing have produced a collection of software tools that can be adapted to managing clusters of machines. Some, such as the Internet communication protocol suite (called TCP/IP and UDP/IP) are so common as to be ubiquitous de facto standards. High level facilities built on the base, such as Intranets, the Internet and the World Wide Web, are similarly becoming ubiquitous. In addition, other tool sets for multisense administration have become common. Together, these are an effective base to tap into for creating cluster software.

In addition to these three technological trends, there is a growing market for computer clusters. In essence, the market is asking for highly reliable computing. Another way of stating this is that the computer networks must have "high availability." For example, if the computer is used to host a web-site, its usage is not necessarily limited to normal business hours. In other words, the computer may be accessed around the clock, for every day of the year. There is no safe time to shut down to do repairs. Instead, a clustered computer system is useful because if one computer in the cluster shuts down, the others in the cluster automatically assume its responsibilities until it can be repaired. There is no down-time exhibited or detected by users.

Businesses need "high availability" for other reasons as well. For example, business-to-business intranet use involves connecting businesses to subcontractors or vendors. If the intranet's file servers go down, work by multiple companies is strongly affected. If a business has a mobile workforce, that workforce must be able to connect with the office to download information and messages. If the office's server goes down, the effectiveness of that work force is diminished.

A computer system is highly available when no replaceable piece is a single point of failure, and overall, it is sufficiently reliable that one can repair a broken part before something else breaks. The basic technique used in cluster to achieve high availability is failover. The concept is simple enough: one computer (A) watches over another computer (B); if B dies, A takes over B's work. Thus, failover involves moving "resources" from one node to another. A node is another term for a computer. Many different kinds of things are potentially involved: physical disk ownership, logical disk volumes, IP addresses, application processes, subsystems, print queues, collection of cluster-wide locks in a shared-data system, and so on.

Resources depend on one another. The relationship matters because, for example, it will not help to move an application to one node when the data it uses is moved to another. Actually it will not even help to move them both to the same node if the application is started before the necessary disk volumes are mounted. In modern cluster systems such as IBM HACMP and Microsoft "Wolfpack", the resource relationship information is maintained in a cluster-wide data file. Resources that depend upon one another are organized as a resource group and are stored as a hierarchy in that data file. A resource group is the basic unit of a failover.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains one or more public networks 101, which is the medium used to provide communications links between various devices, client computers, and server computers connected within distributed data processing system 100. Network 100 may include permanent connections, such as Token Ring, Ethernet, 100 Mb Ethernet, Gigabit Ethernet, FDDI ring, ATM, and high speed switch, or temporary connections made through telephone connections. Client computers 130 and 131 communicates to server computers 110, 111, 112, and 113 via public network 101.

Distributed data processing system 100 optionally has its own private communications networks 102. Communications on network 102 can be done through a number of means: standard networks just as in 101, shared memory, shared disks, or anything else. In the depicted example, a number of servers 110, 111, 112, and 113 are connected both through the public network 101 as well as private networks 102. Those servers make use the private network 102 to reduce the communication overhead resulting from heart-beating each other and running membership and n-phase commit protocols.

In the depicted example, all servers are connected to a shared disk storage device 124, preferably a RAID device for better reliability, which is used to store user application data. Data are made highly available in that when a server fails, the shared disk partition and logical disk volume can be failed over to another node so that data will continue to be available. The shared disk interconnection can be SCSI bus, Fibre Channel, and IBM SSA. Alternatively, each server machine can also have local data storage device 120, 121, 122, and 123. FIG. 1 is intended as an example, and not as an architectural limitation for the processes of the present invention.

Referring to FIG. 2a, Microsoft's first commercially available product, the Microsoft Cluster Server (MSCS) 200, code name "Wolfpack", is designed to provide high availability for NT Server-based applications. The initial MSCS supports failover capability in a two-node 202, 204, shared disk 208 cluster.

Each MSCS cluster consists of one or two nodes. Each node runs its own copy of Microsoft Cluster Server. Each node also has one or more Resource Monitors that interact with the Cluster Service. These monitors keep the Cluster Services "informed" as to the status of individual resources. If necessary, the resource Monitor can manipulate individual resources through the use of Resource DLLs. When a resource fails, Cluster Server will either restart it on the local node or move the resource group to the other node, depending on the resource restart policy and the resource group failover policy and cluster status.

The two nodes in a MSCS cluster heartbeat 206 each other. When one node fails, i.e., fails to send heartbeat signal to the other node, all its resource groups will be restarted on the remaining node. When a cluster node is booted, the cluster services are automatically started under the control of the event processor. In addition to its normal role of dispatching events to other components, the event processor performs initialization and then tells the node manager, also called the membership manager, to join or create the cluster.

The node manager's normal job is to create a consistent view of the state of cluster membership, using heartbeat exchange with the other node managers. It knows who they are from information kept in its copy of the cluster configuration database, which is actually part of the Windows NT registry (but updated differently, as we'll see). The node manager initially attempts to contact the other node, if it succeeds, it tries to join the cluster, providing authentication (password, cluster name, its own identification, and so on). If there's an existing cluster and for some reason our new node's attempt to join is rebuffed, then the node and the cluster services located on that node will shutdown.

However, if nobody responds to a node's requests to join up, the node manager tries to start up a new cluster. To do that, it uses a special resource, specified like all resources in a configuration database, called the quorum resource. There is exactly one quorum resource in every cluster. It's actually a disk; if it is, it's very preferable to have it mirrored or otherwise fault tolerant, as well as multi-ported with redundant adapter attachments, since otherwise it will be a single point of failure for the cluster. The device used as a quorum resource can be anything with three properties: it can store data durably (across failure); the other cluster node can get at it; and it can be seized by one node to the exclusion of all others. SCSI and other disk protocols like SSA and FC-AL allow for exactly this operation.

The quorum resource is effectively a global control lock for the cluster. The node that successfully seizes the quorum resources uniquely defines the cluster. The other node must join with that one to become part of the cluster. This is the problem of a partitioned cluster. It is possible for internal cluster communication to fail in a way that breaks the cluster into two parts that cannot communicate with each other. The node that controls the quorum resource is the cluster, and there is no other cluster.

Once a node joins or forms a cluster, the next thing it does is update its configuration database to reflect any changes that were made while it was away. The configuration database manager can do this because, of course, changes to that database must follow transactional semantics consistently across all the nodes and, in this case, that involves keeping a log of all changes stored on the quorum device. After processing the quorum resource's log, the new node start to acquire resources. These can be disks, IP names, network names, applications, or anything else that can be either off-line or on-line. They are all listed in the configuration database, along with the nodes they would prefer to run on, the nodes they can run on (some may not connect to the right disks or networks), their relationship to each other, and everything else about them. Resources are typically formed into and managed as resource groups. For example, an IP address, a file share (sharable unit of a file system), and a logical volume might be the key elements of a resource group that provides a network file system to clients. Dependencies are tracked, and no resource can be part of more than one resource group, so sharing of resources by two applications is prohibited unless those two applications are in the same resource group.

The new node's failover manager is called upon to figure out what resources should move (failover) to the new node. It does this by negotiating with the other node's failover managers, using information like the resource's preferred nodes. When they have come to a collective decision, any resource groups that should move to this one from the other node are taken off-line on that node; when that is finished, the Resource Manager begins bringing them on-line on the new node.

Every major vendor of database software has a version of their database that operates across multiple NT Servers. IBM DB2 Extended Enterprise Edition runs on 32 nodes. IBM PC Company has shipped a 6-node PC Server system that runs Oracle Parallel Servers. There is no adequate system clustering software for those larger clusters.

In a 6-node Oracle Parallel Servers system, those six nodes share the common disk storage. Oracle uses its own clustering features to manage resources and to perform load balancing and failure recovery. Customers that run their own application software on those clusters need system clustering features to make their applications highly available.

Referring to FIG. 2b, DB2 typically uses a share nothing architecture 210 where each node 212 has its own data storage 214. Databases are partitioned and database requests are distributed to all nodes for parallel processing. To be highly available, DB2 uses failover functionality from system clustering. Since MSCS supports only two nodes, DB2 must either allocate a standby node 216 for each node 212 as shown. Alternatively, DB2 can allow mutual failover between each pair of MSCS nodes as shown in FIG. 2c. In other words, two nodes 212, 212a are mutually coupled to two data storages 214, 214a. The former double the cost of a system and the latter suffers performance degradation when a node fails. Because database access is distributed to all nodes and are processed in parallel, the node that runs both its DB2 instance and the failed over instance becomes the performance bottleneck. In other words, if node 212a fails, then node 212 assumes its responsibilities and accesses data on both data storages, but runs its tasks in parallel.

Therefore, it would be advantageous to have an improved method and apparatus for managing a cluster computer system. Such an improvement should allow support of a failover from one node to another node chosen from a group of many nodes.

SUMMARY OF THE INVENTION

The present invention provides a method and apparatus for managing clustered computer systems and extends small cluster systems to very large clusters. The present invention extends cluster manager functionality to manage the larger cluster but otherwise preserves its ease-of-use characteristics. When discussed in this application, a "multi-cluster" or "IBMCS cluster" refers to a cluster of more than one other clusters or nodes. In one embodiment, a multi-cluster is a cluster of one or more MSCS clusters where the MSCS clusters can consist of one or more nodes.

The system clustering product extends small clusters to multi-clusters of two or more nodes. Further, the present cluster system supports resource group failover among any two nodes in a larger cluster of two or more nodes. The present system also preserves the application state information across the entire cluster in the case of failure events. Also, the present system does not change implementation of small clustering systems and does not require application vendors to make any modification to their present clustering code in order to run in this system's environment. Instead, the present system provides an implementation of the existing cluster API DLL that is binary compatible with the a cluster API DLL.

A multi-cluster normally contains more than one pair of small clusters. The multi-cluster manager can configure a multi-cluster and the multiple clusters within. Resources in a multi-cluster are managed by each individual cluster under the supervision of Cluster Services. There is no need to modify the resource API and the cluster administrator extension API. The multi-cluster manager can use any cluster administrator extension DLL that is developed for the individual cluster as it is without modification.

Applications, whether they are enhanced for an individual cluster or not, can readily take advantage of multi-cluster system clustering features. Instead of mutual failover between one pair of nodes, the multi-cluster allows an application failover between any two nodes in a large cluster. The present invention allows a cluster to grow in size by adding an individual cluster either with a pair of nodes or a single node. The fact that the present invention can support a three-node cluster is very attractive to many customers who want to further improve availability of their mission critical applications over a two node cluster.

Applications, such as DB2 Extended Enterprise Edition, that use clusters can readily take advantage of multi-cluster system clustering features. DB2/EEE exploits MSCS features by dividing nodes into pairs and allows mutual failover between each pair of nodes as discussed above in reference to FIG. 2c. The present invention can either improve DB2 availability by supporting N-way failover or improve DB2 performance characteristics by supporting N+1 model with one standby node. In the most common event of a single node failure, DB2/EEE instance on the failed node will be restarted on the standby node and maintain the same performance in the N+1 mode. System management policy and recovery services are expressed in a high-level language that can be modified easily to tailor to special requirements from application vendors. For example, this allows DB2/EEE to be integrated with a multi-cluster better than with an individual cluster.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4, 4a, and 4b are flow charts of underlying methods used by the present invention to control multiple clusters;

FIGS. 5 and 6 are tables containing example configuration, status, and event processing rules used with the present invention.

DETAILED DESCRIPTION OF THE DRAWINGS

Figure 1:
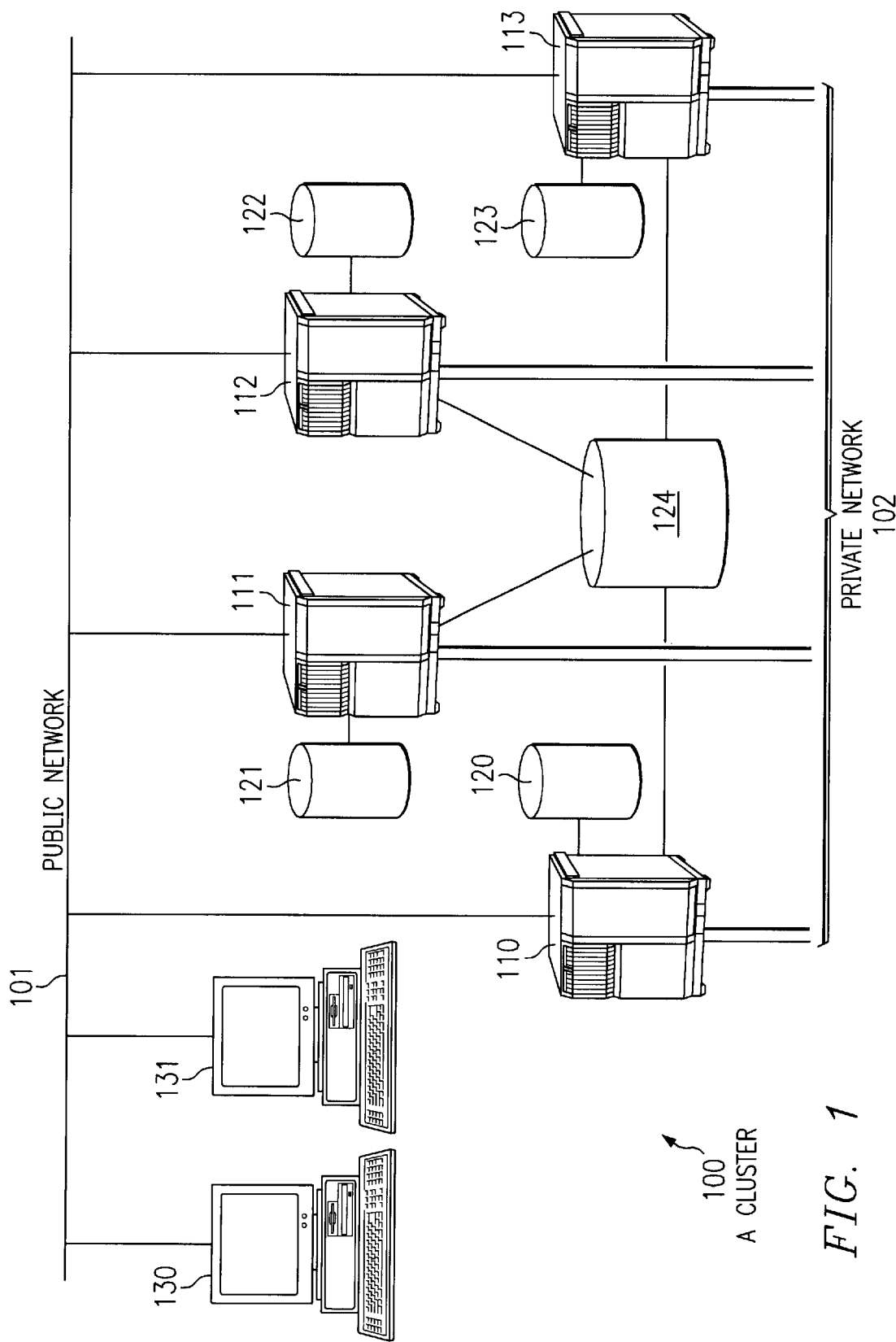
FIG. 1 is a pictorial representation of a distributed data processing system in which the present invention may be implemented.
Figure 2A:
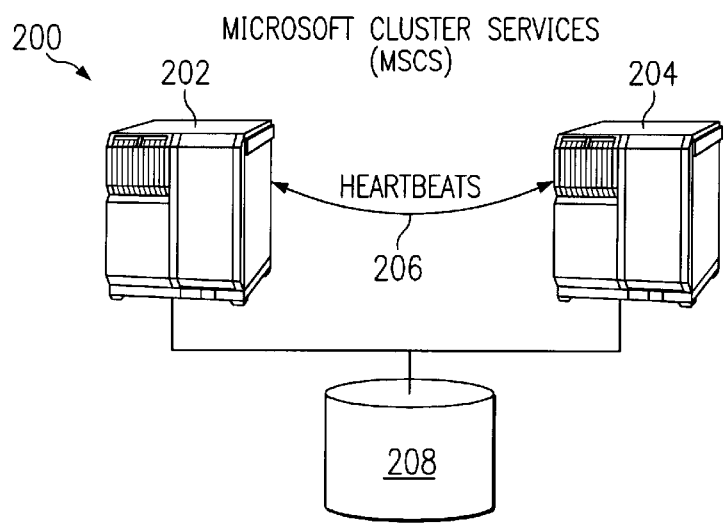
FIGS. 2a, 2b, and 2c provide illustrations of the Microsoft Wolfpack product and its limitations in implementation.
Figure 2B:
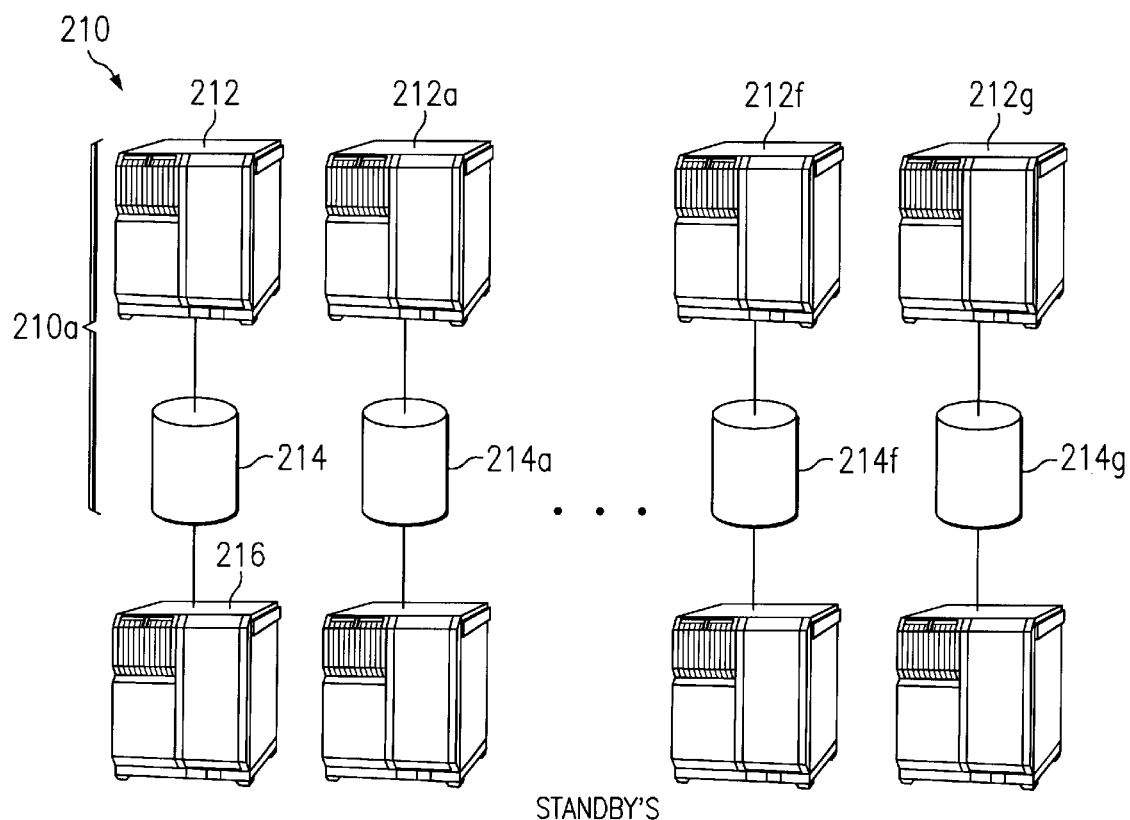
Figure 2C:
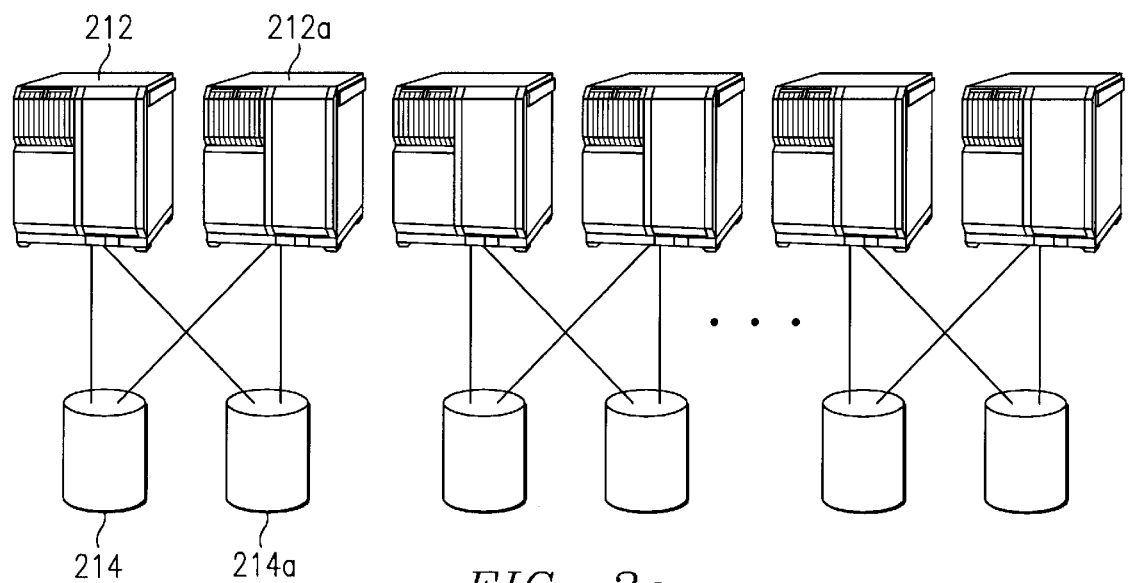
Figure 3:
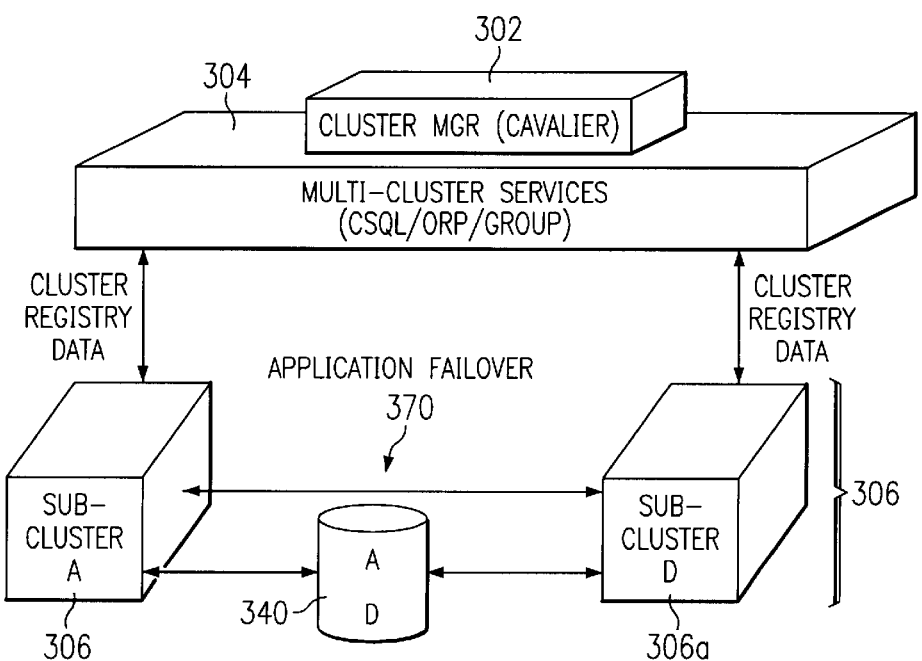
FIGS. 3, 3a, 3b, and 3c, illustrate the present invention and illustrate its implementation across multiple clusters.

With reference now to the figures, and in particular with reference to FIG. 3, a pictorial representation of a distributed data processing system in which the present invention may be implemented is depicted. The software 300 shown in FIG. 3, 3b and 3c can be implemented on the hardware shown in FIG. 3a.

Figure 3A:
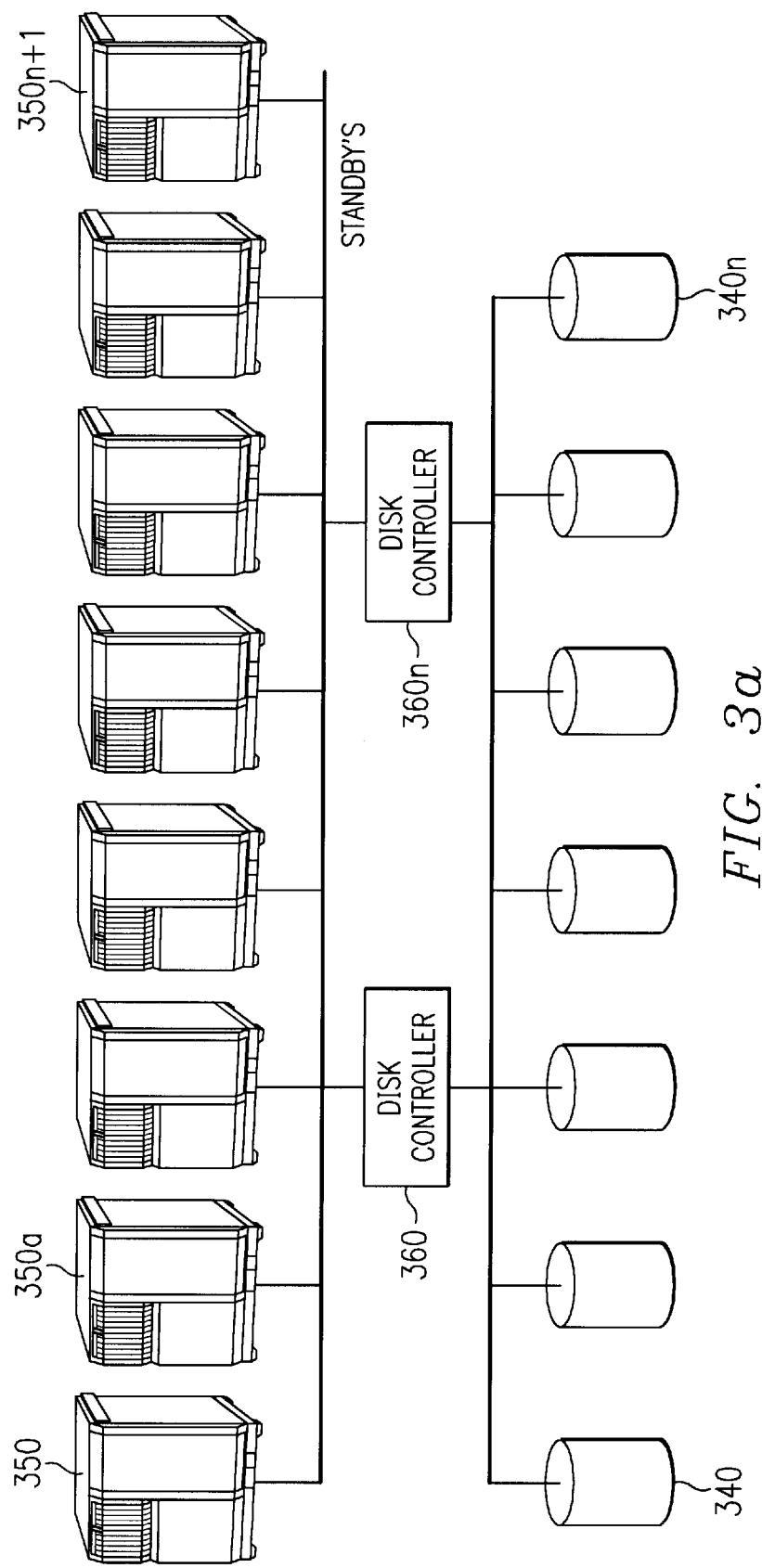

Multi-cluster software, such as IBMCS from IBM Corporation, can scale to larger sizes easily. For example, FIG. 3a shows an eight-node configuration, wherein each node 350 is coupled to a storage element 340 by disk controllers 360. Multi-cluster services allows failover to be between any two nodes in this eight-node cluster. It can be used in both the Oracle cluster or a DB2 cluster discussed above. In the case when any of the seven nodes fails, the DB2 instance will be restarted on the eight node and the performance of the system will remain unchanged. This is called an N+1 failover model. Other configurations are also supported. For example each node may run an active DB2 instance and be backup for the other seven nodes to maximize reliability.

The multi-cluster server (MCS) uses the cluster server to perform resource management. Microsoft does not share its resource management APIs in Windows NT with outside vendors and there is no easy way for other vendors to perform resource management. Some vendors implemented their own device drivers and TCP/IP protocol stack. That results in incompatibility with the MSCS Cluster API and Resource API. The present invention uses the cluster server (CS) to manage resources on a single node, and thus does not need to know the internal NT APIs. The multi-cluster server 304 controls the cluster server 306 to bring a resource and a resource group on-line or off-line on a node 350. Referring to FIG. 3, the multi-cluster server 304 is shown controlling the cluster server 306 and 306a, which are located on different nodes 350 and 350a. The MCS 304 gets the CS 306 to bring resource group containing application 370 off-line and then get the CS 306a to bring that resource group on-line. The MCS is responsible for managing cluster node membership, heartbeat, inter-node communications, and for maintaining the consistency of cluster configuration database for all eight nodes. The multi-cluster server is also responsible for event notification and processing. Cluster manager 302 provides a graphical user interface (GUI).

Figure 3B:
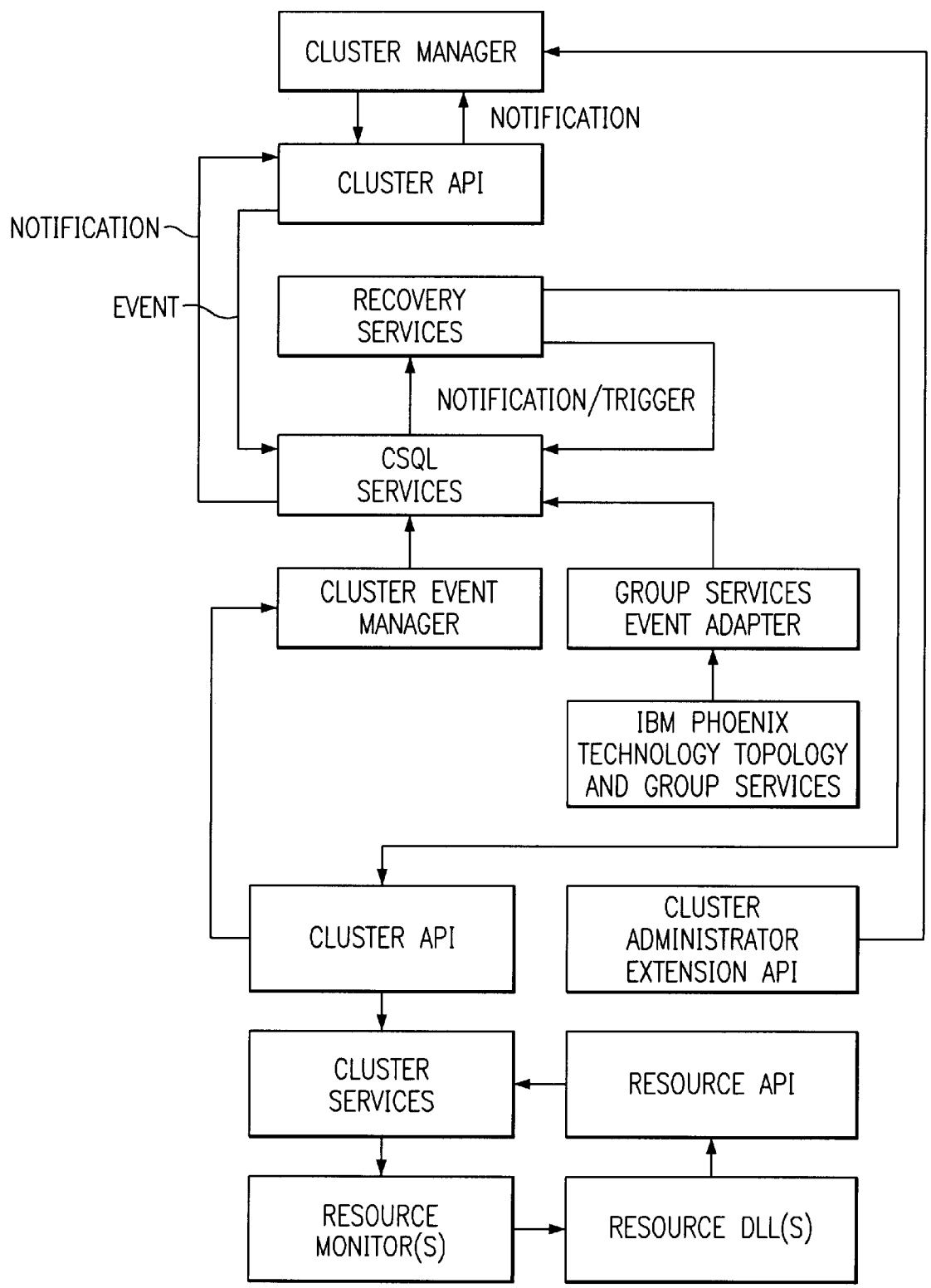
Figure 3C:
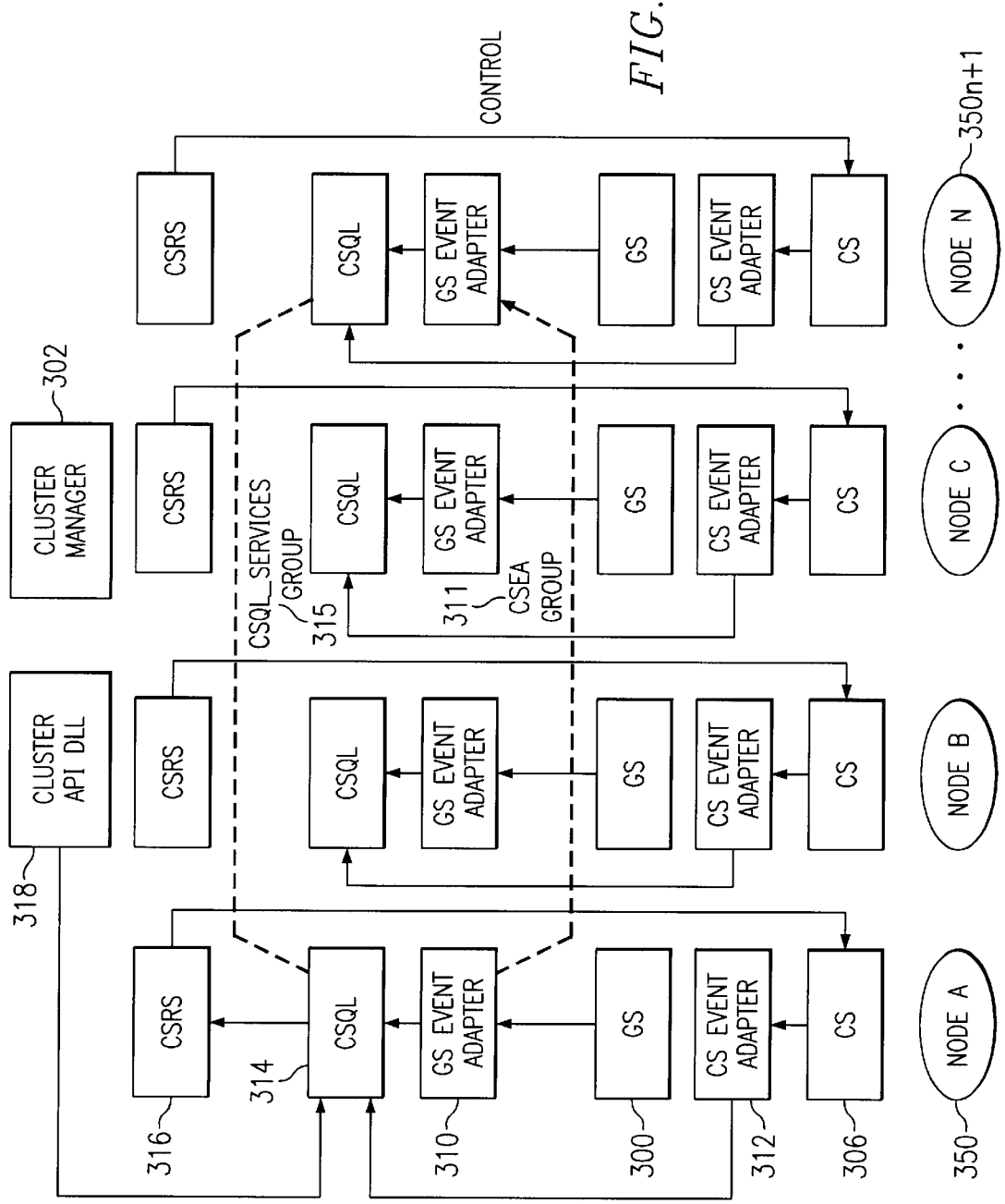

The multi-cluster server is substantially binary compatible with the cluster server. There is no modification required to run any application in a multi-cluster if that application can run in an individual cluster. The MCS supports all cluster API, Resource API, and Administrator Extension API. Referring to FIGS. 3b and 3c, in a multi-cluster, each node runs a copy of the multi-cluster services. When a node 350 is booted, the multi-cluster services 304 is started automatically. The individual cluster services 306 is then started by the multi-cluster server. In this document, we will refer to those individual clusters within a multi-cluster as sub clusters. The configuration information in a multi-cluster configuration database is a super set of the information in each sub cluster. All resources and resource groups are defined in a multi-cluster configuration database and in appropriate sub clusters. When a sub cluster services is started, all resources and resource groups except the default Cluster Group are left in off-line state. The multi-cluster services 304 on a new node determines collectively through CSQL_Services group 315 with multi-cluster server instances on all other nodes which resource groups should be started on that node. It then invokes the cluster services API to bring those resource groups to on-line state.

Each sub cluster consists of either a pair of nodes or a single node. In the case of a single-node sub cluster, the quorum resource can be configured as a local quorum resource, which means that the quorum resource will be a local disk of that node. This is a preferred configuration since it will save a shared disk per sub cluster.

The cluster server has a unique feature that it remembers the state of resources and resource group the last time when it is terminated. When a node is restarted, cluster services will bring those resources and resource groups to the previous state. The decisions of bringing resources and resource groups to their on-line and off-line state is made by the multi-cluster server. If a sub cluster (or the node that runs that sub cluster) fails, multi-cluster services will restart those resources and resource groups that were running on that node on some other sub clusters. When the failed node and the corresponding MSCS sub cluster is restarted and re-joins the multi-cluster, there will be resources conflicts if the new node and new sub cluster try to bring those resources and resource groups to on-line state. To resolve this problem, multi-cluster services adds a "hidden" resource into every resource group and make this hidden resource a dependent resource for all other resources in that resource group. The hidden resource will check the state of its resource group in the multi-cluster configuration database and will fail to start if the resource group is already running on another sub cluster.

The multi-cluster services extend the high availability system clustering features of individual cluster services to more than two nodes and preserves binary compatibility with the individual cluster services. This technique can be applied to future clustering software from Microsoft as well as from other companies to create even larger cluster.

Referring to FIGS. 3b and 3c, the present system clustering software 300 consists of two major parts: cluster manager 302 and the cluster services 304. The cluster manager 302 is designed to manage all resources in a group of clusters 306 and to present a single cluster image to its users. The cluster manager 302 provides an easy-to-use user interface to which information technology (IT) administrators are accustomed. The cluster manager 302 allows administrators to manage a large scale and complex collection of highly available resources in a cluster efficiently and effectively.

The cluster services 304 is a middle-ware layer that runs on each computer 350 in the cluster. It comprises a set of executables and libraries that run on the resident Microsoft Windows NT server or other suitable server. The multi-cluster server 304 contains a collection of inter-acting sub systems. Those sub systems are Topology Services 308, Group Services 310, Cluster Coordinator (not shown), CSQL Services 314, Event Adapters 310, Recovery Services 316, and the Cluster API 318.

The Cluster Coordinator provides facilities for start up, stop, and restart of the cluster services 304. There is a Cluster Coordinator on each computer in the cluster, but they do not communicate with each other; each one's scope is restricted to the computer on which it runs. The Cluster Coordinator is the component that needs to be started up first, and it then brings up the other services in the following order: CSQL Services 314 in stand-alone mode, Topology Services 308, Group Services 308, CSQL Services 314 in Cluster-mode, Recovery Services 316, Cluster Services Event Adapter, Cluster Services, and Group Services Event Adapter (GSEA). Further, it monitors each of the other services, and terminates all other services and user applications and restarts the multi-cluster Services in case of failures.

Topology Services 308 sends special messages called heartbeats that are used to determine which nodes are active and running properly. Each node checks the heartbeat of its neighbor. Through knowledge of configuration of the cluster and alternate paths, Topology Services 308 can determine if the loss of a heartbeat represents an adapter failure or a node failure. The sub cluster's inter-node heartbeat is ignored in favor of the topology services heartbeat which is multi-cluster wide. Topology Services maintains information about which nodes are reachable from which other nodes, and this information is used to build a reliable messaging facility.

Group Services 310 allows the formation of process groups containing processes on the same or different machines in the cluster. A process can join a group as a provider or a subscriber. Providers participate in protocol actions discussed in detail below, on the group while subscribers get notified on changes to the group's state or membership (list of providers). Group Service 310 supports notification on joins and leaves of processes to a process group. It also supports a host group that one can subscribe to in order to obtain the status of all the nodes in the cluster. This status is a consistent view of the node status information maintained by Topology Services.

All sub clusters in a multi-cluster are preferably configured as single-node clusters. Group Services are used for monitoring node up and node down events.

Group Services also provides the following facilities for cluster-aware applications to handle failure and reintegration scenarios. These facilities are built on top of the reliable messaging facility: Atomic broadcast and n-phase commit protocols for process join, process leave—voluntary and involuntary, process expel, group state change, and provider broadcast messages.

Group Services 310 handles partitioning of the cluster in the following manner. When it recognizes that a cluster that was partitioned has come together, it will generate a dissolve notification to all groups that were part of the partition that has the lesser number of cluster machines. If both partitions have equal number of cluster machines, one of them is chosen to be dissolved.

CSQL Services 314 provides support for a database that can contain configuration and status information. It can function in both stand-alone and cluster modes. Each database is a persistent, distributed resource which, through the use of Group Services 310, is guaranteed to be coherent and highly available. Each database is replicated across all nodes and check pointed to disk so that changes are obtained across reboots of the multi-cluster services. CSQL Services 314 ensures that each node has an identical copy of data. CSQL Services also supports transient type of data that does not persist across reboot but is also consistent on all nodes. Transient data will be initialized to their startup values after a restart of cluster services 304. CSQL Services 314 supports notification of changes made to the database. Each database can be marked by a three tuple: a timestamp indicating when a database is last modified, ID of the node that proposed the modification, and a CRC checksum. The timestamp is a logical time that is a monotonically increasing number across the entire cluster. CSQL Services 314 runs a Database Conflict Resolution Protocol to determine the most up-to-date replica upon a cluster restart. A node replaces its replica by the cluster's version after making a backup of the existing version of each replace database when it rejoins a cluster. Modification to a cluster configuration database is permitted only after CSQL transits from stand-alone mode to cluster mode. The conditions for entering cluster mode will be discussed thoroughly below. CSQL Services supports both local and remote client connections.

Event Adapters 312 monitors conditions of sub systems and generates events when failure situation occur. Events are inserted into a distributed event queue, which is implemented as a event table in the cluster-scope CSQL configuration database. There are four event adapters in a cluster: Cluster Serivces Event Adapter that monitors the Cluster Services sub system, Group Service Event Adapter that monitors node and network interface failures, multi-cluster API Event Adapter that converts user request into multi-cluster services events, and Partition Prevention Event Adapter that monitors network partition.

Group Services Event Adapter (GSEA) 310 is a distributed sub system. Each GSEA joins a GSEA Group Services group 311 as a provider. GSEA receives LEAVE, and FAILURE LEAVE notification from Group Services and converts them into IBMCS events. GSEA as a group inserts exactly one event into the event queue when a GSEA leaves the group either voluntarily or due to failure.

Microsoft Cluster Services Event Adapter (CSEA) 320 converts a cluster services notifications into events recognizable by the present cluster manager. There is one instance of CSEA running on each node. Each CSEA is used to monitor cluster resource groups and resources that are running on the local node only. When sub clusters in a multi-cluster are configured as single-node clusters, the heartbeat mechanism is effectively disabled. Network interface failure and node failure will be detected by the Topology and Group Services sub system 308.

Recovery Services 310 is a rule-based object-oriented, and transactional event processing subsystem. Event processing is triggered when a new event is inserted into the cluster-wide event table in a cluster-scope CSQL database. Recovery Services extends the CSQL functionality and added active and object-oriented SQL statement processing capability into the CSQL sub system. Methods are expressed in the active SQL language. Specifically, the following SQL-like active SQL statement are introduced: CREATE TRIGGER, EVALUATE, EXECUTE, CONTINUE, CREATE MACRO, and LOAD DLL. CREATE TRIGGER statement registers a trigger on the specified table with CSQL. When a new row (event) is inserted into the specified table, CSQL will invoke the corresponding event processing rules. Rules are expressed in SQL and the above mentioned active SQL statements. EVALUATE statement is very similar to SELECT. Instead of select a set of data, an EVALUATE statement selects a set of rules and then evaluates those rules. SQL and active SQL statements that are selected and processed by the same EVALUATE statement are part of the same transaction. EXECUTE statement changes the physical system state by invoking either a user defined function, an external program, a command file, or a shell script file. CONTINUE statement synchronized event processing among distributed CSQL Servers. In particular, CONTINUE statement synchronizes the CSQL database till the point of the CONTINUE statement. There can be multiple CONTINUE statements each time when event processing is triggered. Create MACRO statement defines the specified macro which can be invoked in any SQL statement. A macro returns a data value that can be used in a SQL statement. LOAD DLL dynamically loads the specified dynamically linked library (DLL) into SCQL. During the DLL initialization code, it registers those user defined functions in the DLL into CSQL. User defined functions can be invoked either in an EXECUTE statement or embedded in any other SQL statements. User defined function extends SQL language either by providing commonly used functionality or initiates actions on physical entities external to CSQL Server. As an example, user defined functions are used to control cluster services resource management facilities.

Multi-cluster API 318 provides access to a multi-cluster as a whole, not a particular sub cluster. It contains functions that can handle a larger cluster but otherwise is functionally identical to those functions of the Cluster API. It is intended to be used by the Cluster Manager 302 as well as other cluster-aware applications. There is a one-to-one correspondence between functions in the multi-cluster API to that of the Cluster API. The similarity between the two Cluster APIs can help application vendors to take advantages of clustering features now and to migrate to greater-than-two-node clusters in the future. The multi-cluster API DLL is binary compatible with the individual Cluster API DLL, clusapi.dll. The query type of Cluster API functions are handled directly by the multi-cluster API DLL. Those Cluster API functions that cause state changes are converted into events which are handled by multi-cluster Recovery Services. The multi-cluster API DLL used CSQL Notification to wait for the result of event processing. The multi-cluster API DLL communicates with CSQL Services via a well known virtual IP address. In sum, the cluster services 304 guarantee that the state information put into NT cluster registry by an application program will be available when that application falls over to another node in a cluster. The cluster services 304 provides utilities that examine the system configuration and make sure that a system is properly configured for installation and running system clustering features. Clusters are configured accordingly when it is first started. Accompanying cluster services 302, the multi-cluster manager will configure, manage, and monitor clusters and its contained MSCS clusters.

Other utilities may be developed to help simplify the installation process of multiple sub clusters and the Multi-cluster Services.

The cluster services sub systems are started by the Cluster Coordinator sub system. The Cluster Coordinator is implemented as an NT service and is started automatically during startup. The cluster coordinator then starts all other Cluster Services sub systems in the following order: CSQL Services in stand-alone mode. Topology Services, Group Services, CSQL Services in cluster mode, Recover Services, Cluster Services Event Adapter, Cluster Services, and Group Services Event Adapter.

CSQL Services is initially started in stand-alone mode. Topology Services and Group Services retrieves their configuration information from CSQL databases. After Group Services comes up, CSQL Services forms the CSQL_Services group 315 and runs a Database Conflict Resolution Protocol (DCRP) to synchronize the contents of the cluster configuration database. The first CSQL server forms the group, set the CSQL_Services group in a BIDDING state, and starts a timer to wait for other CSQL servers to join the group. A CSQL server that joins the group which is in the BIDDING state also starts a timer to wait for others to join. The timer value is defined in the cluster configuration database and may be different from node to node. Inconsistent timer values can be caused by different versions of cluster configuration databases that are being used by different nodes initially. When the first timer expires, the CSQL server broadcasts the timestamp of its cluster configuration database to the group using a Group Services n-phase protocol. Other CSQL servers broadcast their timestamps if their timestamp is more recent than the received one. When multiple CSQL servers send out their timestamp, one will be selected arbitrarily by Group Services and broadcast to the group in the next phase. A CSQL server sends out its timestamp only if its timestamp is better than the received timestamp. A CSQL server should send out its timestamp even if its is older than the received one only in the first phase in order to signal other CSQL servers that it has a different version. Eventually the protocol will conclude. Either all CSQL servers have identical timestamp or they all agree on the most up-to-date version. If not all timestamps are identical, the CSQL server that sends out its timestamp the last should broadcast its database to all others. CSQL servers should make a backup copy for database that are to be replaced by the latest version. After CSQL servers synchronize the cluster configuration database, they will set the state of the CSQL_Services group to its RUNNING state. Those CSQL Servers whose replica got replace by a new version will initiate a restart of Cluster Services. A CSQL server that joins a RUNNING CSQL_Services group must save its replica and replace it by the cluster version regardless of its timestamp value. If the new version has a different timestamp than its existing one which is presently being used by other sub systems, the CSQL Server will initiate a restart of Cluster Services.

The CSQL timestamp is a three tuple: a monotonically increasing number across the entire cluster, the node ID of the node that modified the database the last time, and a CRC check sum.

Once CSQL Services is in RUNNING state, the cluster configuration database including the event queue are consistent on all nodes. A CSQL server is said to be in cluster mode after it successfully joins a RUNNING CSQL_Services group. Recovery Services, MSCS, MSCS Event Adapter (MSCSEA), and Group Services Event Adapter (GSEA) will then be started. The GSEA joins a GSEA Group Services group and adds a BRING_COMPUTER_UP event for this node into the cluster-wide event queue in processing the Group Services JOIN protocol. IBMCS resource groups are initially in offline state. During the processing of a BRING_COMPUTER_UP event, Recovery Services determines whether any resource group should be brought into online state.

The DCRP algorithm is summarized below: (1) A CSQL server broadcast a open database request including the name of the database and a timestamp to the CSQL_Services group, (2). Each CSQL server that has a different timestamp must vote CONTINUE and broadcast its timestamp in the first phase to force a database replication, (3) The CSQL server that receives its own broadcast must vote APPROVE in the first phase, (4) A CSQL server that has identical timestamp as the received one must vote APPROVE, (5) for each subsequent phase, a CSQL server that has a later timestamp than the received one must broadcast its timestamp and vote CONTINUE, (6) a CSQL server that receives its own timestamp must vote CONTINUE, (7) a CSQL server that has the same or any earlier timestamp must vote APPROVE, (8). If no message was sent in a phase, the server that broadcast its timestamp the last must replicate its version of the database to other servers. A server always makes a backup copy of its replica before replacing it.

Still referring to FIGS. 3b and 3c, the start-up sequence for the multi-cluster system is illustrated. First, the Cluster Coordinator is started as NT Services during NT startup. The Cluster Coordinator starts and monitors other multi-cluster sub systems. Next, CSQL Services 314 is started in stand-alone mode. Then, Topology Services 308 is started. Group Services 310 is then started. Next, CSQL Services forms or joins the CSQL_Services group 315. CSQL Services runs the Database Conflict Resolution Protocol and enters cluster mode. Then all cluster scope databases are up-to-date. In particular, the event queue is up to date. Recovery Services 316 is started and Recovery Services daemon starts both the Cluster Services Event Adapter 312 and the group Services Event Adapter 310, in this order. Group Services Event Adapter (GSEA) 310 is started. GSEA forms or joins the GSEA group and it will monitor node failure events. Recovery Services daemon then inserts A BRING_COMPUTER_UP event for the local node. Recovery Services processes the BRING_COMPUTER_UP event for this node. Cluster services sub system 306 is started and then monitored by the Cluster Services Event Adapter 312. Resource groups are started or moved to this new node depending on resource allocating policy and system status.

Another key feature of the present invention involves the Cluster Quorum Condition. No resource group can be brought into its online state unless one of the following quorum conditions have been met. Cluster Services adopts the same majority quorum scheme that is used in HACMP. Cluster Services uses connectivity information provided by Group Services to Determine majority quorum condition. Additionally nodes also pass connectivity information through the shared disk path or other method to avoid the split brain problem. When the network is severed and a cluster is divided into several partitions, Cluster services must guarantee not to start a single resource group in multiple partitions at the same time which can cause corruption to application data on shared disks. The connectivity information passed on disk path helps each partition to learn about sizes of other partitions and hence help prevent data corruption. A resource group should be brought into online state on one if the following conditions is true: (1) the partition has majority quorum, i.e., more than half of all nodes defined in the cluster configuration database has joined a cluster and is in that partition, or (2) the partition has exactly half of the nodes as defined in the cluster configuration database and there exists no other partitions of the same size, or (3) the partition has exactly half of the nodes as defined in the cluster configuration database while another partition contains the other half of the nodes and that the smallest node ID is in the former partition.

After starting all Cluster Services sub systems, the Cluster Coordinator will monitor the status of each sub system. If any sub system terminates abnormally, the Cluster Coordinator will shutdown the node and will restart itself as well as other sub systems. Shutting down a node when any sub system fails can guarantee that no user applications will continue running when Multi-cluster Services fails.

When a partition heals, Group Services will resolve groups in all but one partition. Group Services daemon in those partitions will be terminated. Consequently those nodes will be shut down by the Cluster Coordinator and restarted. The shutdown procedure for Recovery Services must make sure that all resource groups are offline.

Referring to FIG. 3c, the COMPONENT SUPPORT for the present invention is illustrated. Multi-cluster server 304 uses the cluster server 306 to manage cluster resources. A resource group is defined in cluster configuration database first and defined in a sub cluster only if needed. Resource management policy is designed to mimic the cluster server resource management behavior. When a resource group is defined in a sub cluster, the restart flag is always disabled so that a restart decision will be made by event processing subsystem, not by the individual cluster server. A resource group defined in a sub cluster, whether it is a single node cluster, will have at most one node in the preferred node list so that the cluster auto failover mechanism is disabled. Cluster Services will monitor the status of every resource group that is online. When a resource or resource group failure occurs, the Cluster Services Event Adapter 312 will insert the corresponding event into the event queue. CSQL Services 314 will trigger event processing for the event. One and only one CSQL instance will initiate event processing. Each CSQL instance manages resources including the single-node sub cluster on the local node only. Event processing is designed to be able to handle multiple failures.

Referring to FIGS. 4, 5, and 6, another aspect of the invention involves Event Processing. Events defined in Cluster services include but not limited to: BRING_COMPUTER_UP, BRING_COMPUTER_DOWN, BRING_RESOURCE_GROUP_ONLINE, BRING_RESOURCE_GROUP_OFFLINE, AND MOVE_RESOURCE_GROUP. When a computer joins a cluster, a "BRING_COMPUTER_UP" event will be inserted into the event queue. To process a BRING_COMPUTER_UP event, the multi-cluster services need to do the following: (1) Check whether a quorum exists, and (2) If so, then check whether any resource group should be brought up on the new computer. Some resource groups may be online on some other computer. Those resource groups should be brought into offline state first. Next, multi-cluster services should bring those resource groups that are in offline state online on the new computer.

All the configuration information, status information, resource management policy, and rules are stored in a cluster scope database, escluster.cfg. Support that computer "hilltop" joins a cluster. An BRING_COMPUTER_DOWN event for hilltop is inserted into the event queue. Which triggers CSQL to perform event processing wherein a runtime environment is created which encapsulate the information relevant to the event and CSQL processes the following statement:

EVALUATE action from ch_routines where ch_routine= "BRING_COMPUTER_UP"

The above statement specifies that statements in the BRING_COMPUTER_UP row of the ch_routines table in the escluster.cfg database should be processed.

The ca_resource_groups table is defined in FIG. 6. The table shows one row of the table. Each entry is one column.

$_failback_node( ) is a macro which returns a node where the specified resource group should be running based on the specified failback policy and given the fact that a new node rejoins a cluster. $_resource_group-online( ) and $_resource_group_offline( ) are user defined functions that use MSCS Cluster API function calls to bring the specified resource group offline and online on the specified computer node. As a result of processing "EVALUATE action from ch_routines where ch_routine='BRING_COMPUTER_UP'", the following statements are selected and then processed:

"evaluate markup_action from computers where computer+$_get_event_node( );

evaluate action from ch_routines where $_has_quorum90 and ch_routine=NODE_UP;"

As a result of processing of the second EVALUATE statement, the following three statements are retrieved and then processed:

evaluate failback_action from ch_resource_groups where current_node<>next_node;

evaluate release_action from ch_resource_groups where current_node <>next_node;

evaluate acquire_action from ch_resource_groups where current_node=" " and next_node=$_get_event_node( );

Those three EVALUATE statements will each search for all ch_resource_group rows (object) in the ch_resource_groups table that meets the search condition. When a ch_resource_group row (object) is found, the specified action will be applied to that object.

The failback_action contains a single statement, which is:

"update ch_resource_groups set next_node=$_failback_node( ) where ch_resource_group=this ch_resource_group;"

In the above update statement, a macro failback_node( ) is processed which returns a node that is the most preferred node for running the specified resource group given that a new node has just joined the cluster. The update statement stores the returned node name into the next_node column. A macro name is prefixed by $_to simplify parsing.

The current_node column of a ch_resource-group object indicates the current node where the ch_resource_group is running on. The release_action is processed for this ch_resource_group if the current_node is different from the next node. If that is the case, the following statement is processed;

execute $_resource_group_offline( );

Resource_group_offline( ) is a user defined function which in term calls the MSCS OfflineResourceGroup( ) function to bring the implied resource group to its offline state. A user defined function is prefixed by $_to simplify parsing.

Finally, the acquire_action is retrieved and processed on the new node for all those ch_resource_group objects that are not running anywhere and that should be running on the new node. The acquire_action contains one statement:

execute $_resource_group_online( )

resource_group_online( ) is also a user defined function which calls the Cluster Server OnlineResourceGroup( ) function to bring the implied resource group to its online state.

Cluster Services also supports event simulation. When Recovery Services is invoked to simulate an event, it first clones the cluster configuration database. The event simulation will be performed on the private copy of the configuration database so that the original configuration database will not be affected. During a simulation, the EXECUTE statement which actually changes the state of physical resources.

FIG. 4 illustrates the method implemented by a multi-cluster when a node wants to join 400 a cluster. First, a node joins the cluster (step 402). A decision is made as the whether a quorum exists (step 404). If not, the method returns (step 406). If a quorum does exist, then for every resource group, the following loop is implemented (step 405). First a query is made whether any resource group should be failback to the new mode (step 408). If so, then for each such resource group, the system gets the corresponding sub cluster to do an off-line of the specified resource group (step 410). A continue (step 418) is performed to synchronize all the nodes. The sub cluster on the new node will bring the specified resource group to the online state (step 414). A query is then made (step 412) to see if there are more resource groups. If not, the system is done (step 416); otherwise the method returns to step 405.

FIG. 4a illustrates a flow chart of the method 430 to move a resource group from one node to another. Every node computes the next most preferred node to run the resource group based on node status, the resource group preferred node list, and the failover policy (step 434). Alternatively, the user can simply specify the next node. Next, the system queries if the current node is not equal to the next node (step 436). If not, the system is done (step 438). If so, then the system gets the sub-cluster on the current node to bring the specified resource group to offline (step 440). The process then continues (step 442). During this step, the system synchronizes its event processing. Afterwards, the system gets the cluster on the next node to bring the specified resource group to online state (step 444). Finally, the system is done (step 446).

Figure 4B:
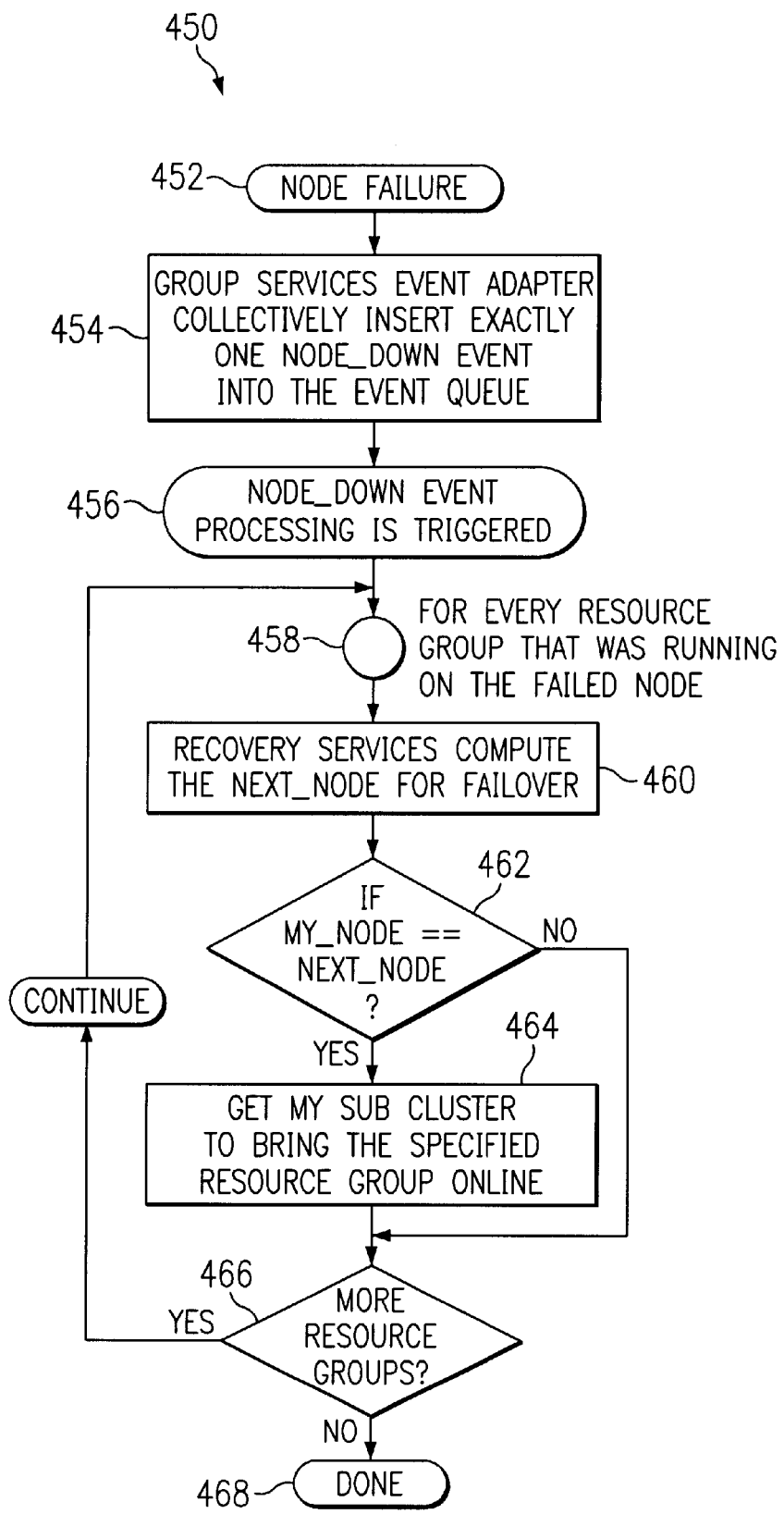

FIG. 4b illustrates the general method 450 implemented by a multi-cluster when a node failure occurs. This method can also be applied to resource failure and resource group failure events. The group service event adapter collectively inserts exactly one node down event into the event queue (step 454). Node_Down event processing is triggered (step 456). Next, for every resource group that was running on the failed node, the following steps are applied (step 458). First, recovery services compute the Next_Node for failover (step 460). Then a decision is made if My_Node==Next_Node. If not, the system checks if there are more resource groups (step 462). If so, then the system gets the sub-cluster to bring the specified resource group online (step 464). If no more resource groups are available, then the system is done (step 464). If more are available, then the system loops back to step 458.

While the invention has been described as using MSCS sub-clusters, it is important to understand that this is only one embodiment of the invention. For example, this same system could be built on top of IBM's HACMP or Sun Microsystem's Ultra Enterprise Cluster HA Server. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A data processing system comprising:
   (a) means for establishing a multi-cluster comprising at least a first cluster, wherein the first cluster comprises at least a first node, and a second cluster, wherein the second cluster comprises at least a second node;
   (b) means for managing the first cluster with a first cluster services program and managing the second cluster with a second cluster services program; and
   (c) means for managing inter-node communication between the first node and the second node with a multi-cluster services program.

2. The data processing system of claim 1 wherein (c) comprises means for initiating the multi-cluster services program automatically when the first node is booted.

3. The data processing system of claim 2 further comprises means initiating the first cluster services program resident on the first node after initiating the multi-cluster services program.

4. The data processing system of claim 3 wherein the multi-cluster services program and the first cluster services program are binary compatible.

5. The data processing system of claim 1 further comprises:
   (d) means for failing over between the first node and the second node within the multi-cluster.

6. The data processing system of claim 5 wherein (d) comprises means for updating a cluster wide data file.

7. The data processing system of claim 1 wherein the multi-cluster services program manages using a resource API within the first node and the second node.

8. The data processing system of claim 1 wherein (a) comprises means for establishing a multi-cluster of at least three nodes.

9. The data processing system of claim 1 wherein (c) comprises means for managing a cluster node membership database.

10. The data processing system of claim 1 wherein (c) comprises means for managing a heartbeat signal sent between the first node and the second node within the multi-cluster.

11. The data processing system of claim 1 further comprises means for presenting an image of a single cluster with a cluster manager.

12. A method of managing a clustered computer system, said method comprising the steps of:
   (a) establishing a multi-cluster comprising at least a first cluster, wherein the first cluster comprises at least a first node, and a second cluster, wherein the second cluster comprises at least a second node;
   (b) managing the first cluster with a first cluster services program and managing the second cluster with a second cluster services program; and
   (c) managing inter-node communication between the first node and the second node with a multi-cluster services program.

13. The method of claim 12 wherein step (c) comprises initiating the multi-cluster services program automatically when the first node is booted.

14. The method of claim 13 further comprises initiating the first cluster services program resident on the first node after initiating the multi-cluster services program.

15. The method of claim 14 wherein the multi-cluster services program and the first cluster services program are binary compatible.

16. The method of claim 12 further comprises:
(d) failing over between the first node and the second node within the multi-cluster.

17. The method of claim 16 further comprises:
(d) failing back to said first node.

18. The method of claim 16 wherein step (d) comprises updating a cluster wide data file.

19. The method of claim 12 wherein the multi-cluster services program manages using a resource API within the first node and the second node.

20. The method of claim 12 wherein step (a) comprises establishing a multi-cluster of at least three nodes.

21. The method of claim 12 wherein step (c) comprises managing a cluster node membership database.

22. The method of claim 12 wherein step (c) comprises managing a heartbeat signal sent between the first node and the second node within the multi-cluster.

23. The method of claim 12 further comprises presenting an image of a single cluster with a cluster manager.

24. A computer program product for executing a method in a data processing system, (a) first instructions for establishing a multi-cluster comprising at least a first cluster, wherein the first cluster comprises at least a first node, and a second cluster, wherein the second cluster comprises at least a second node;

(b) second instructions for managing the first cluster with a first cluster services program and managing the second cluster with a second cluster services program; and (c) third instructions for managing inter-node communication between the first node and the second node with a multi-cluster services program.

25. The computer program product of claim 24 further comprises:
(d) fourth instructions for failing over between the first node and the second node within the multi-cluster.

26. The computer program product of claim 24 wherein said third instruction further comprises instructions for managing a cluster node membership database.

27. The computer program product of claim 24 wherein said third instructions further comprises instructions for managing a heartbeat signal sent between the first node and the second node within the multi-cluster.

* * * * *

UNITED STATES PATENT AND TRADEMARK OFFICE
CERTIFICATE OF CORRECTION

PATENT NO. : 6,393,485 B1
DATED : May 21, 2002
INVENTOR(S) : Chao et al.

It is certified that error appears in the above-identified patent and that said Letters Patent is hereby corrected as shown below:

Column 14,
Line 41, after "of a" please delete "ch_resource-group" and insert
-- ch_resource_group --.

Signed and Sealed this

Sixth Day of May, 2003

JAMES E. ROGAN
*Director of the United States Patent and Trademark Office*